United States Patent

McBroom

[11] Patent Number: 5,562,318
[45] Date of Patent: Oct. 8, 1996

[54] ANIMAL WASTE COLLECTOR

[76] Inventor: James P. McBroom, 3753 S. Lakeshore Dr., House Springs, Mo. 63051

[21] Appl. No.: 380,498

[22] Filed: Jan. 30, 1995

[51] Int. Cl.$^6$ .............................. A01K 29/00; E01H 1/12
[52] U.S. Cl. .......................................... 294/1.4; 294/55.5
[58] Field of Search ............................ 294/1.3, 1.4, 1.5, 294/19.2, 49, 55, 55.5; 56/400.01, 400.16, 400.21

[56] References Cited

U.S. PATENT DOCUMENTS

| | | | |
|---|---|---|---|
| D. 209,660 | 12/1967 | Lind | 294/1.4 |
| 385,751 | 7/1888 | Gibbs | 56/400.21 |
| 888,927 | 5/1908 | Quinsey | 294/55.5 |
| 1,267,778 | 5/1918 | Leen | 294/55.5 |
| 1,601,745 | 10/1926 | Swineford et al. | 56/400.16 |
| 4,019,768 | 4/1977 | Niece | 294/19 R |
| 4,316,627 | 2/1982 | Solypa | 294/1.4 |
| 4,969,675 | 11/1990 | Zahrowski | 294/1.3 |

FOREIGN PATENT DOCUMENTS

| | | | |
|---|---|---|---|
| 313948 | 8/1919 | Germany | 56/400.21 |
| 53015 | 8/1911 | Switzerland | 56/400.21 |

Primary Examiner—Dean Kramer
Attorney, Agent, or Firm—Armstrong, Teasdale, Schlafly & Davis

[57] ABSTRACT

An animal waste rake apparatus wherein the rake comprises both a collecting surface and a holding surface. The collecting surface slopes down toward the holding surface, thus allowing for the collecting and retaining of animal waste. The collecting surface is comprised of several parallel rods, allowing for efficient collection of animal waste from any surface.

5 Claims, 2 Drawing Sheets

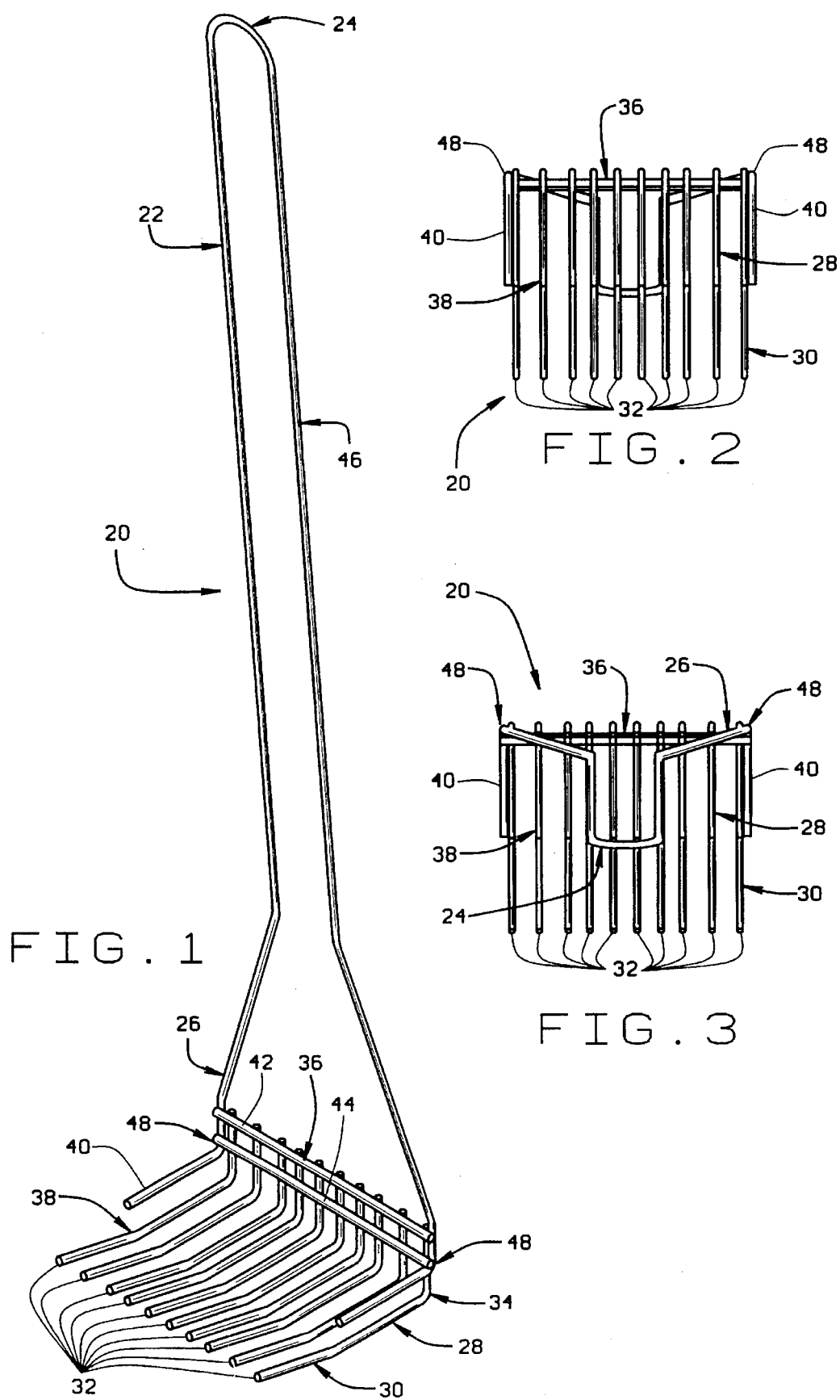

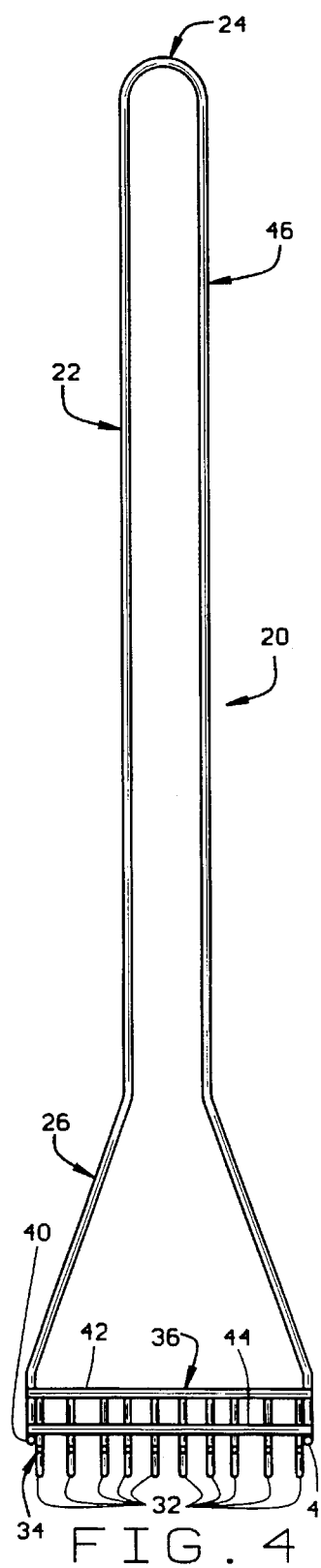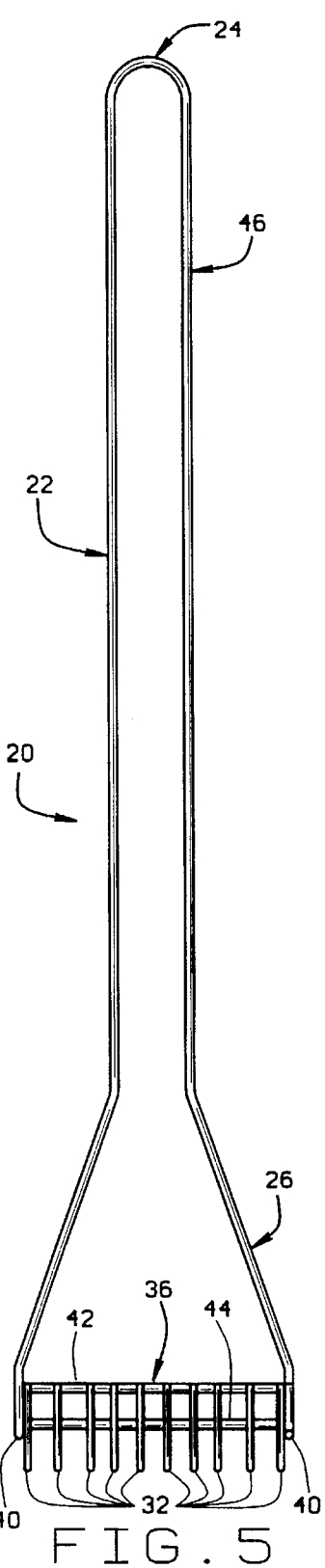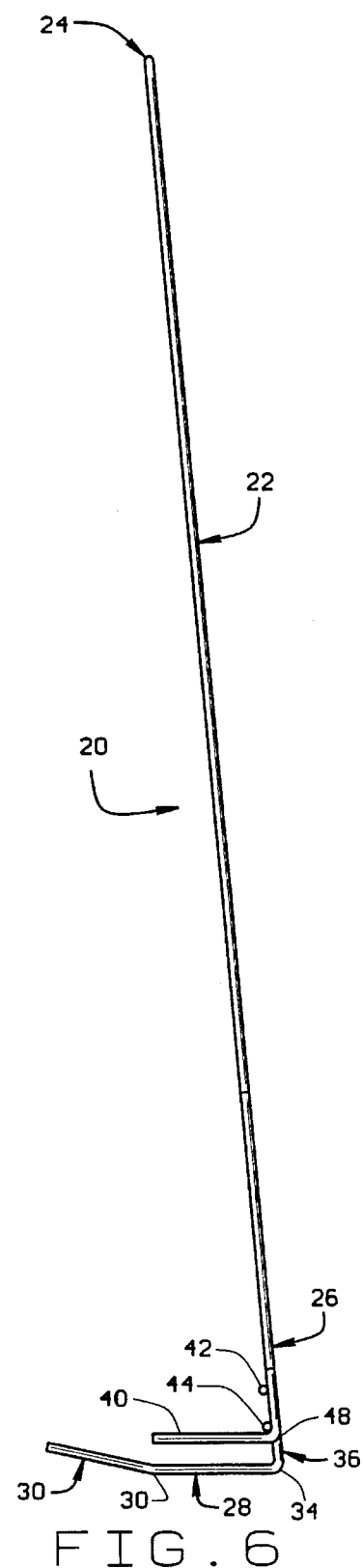

ANIMAL WASTE COLLECTOR

BACKGROUND AND SUMMARY OF THE INVENTION

This invention relates to an animal waste collector for picking up animal waste from the ground.

A wide variety of animal waste collectors have been marketed to help pet owners clean up after pets. The devices are typically bulky, and cumbersome to use. Many of the devices are either inefficient as to collecting the waste, or as to holding the waste until it can be properly disposed of.

The animal waste collector of the present invention is lightweight and easy to use. The apparatus is of simple construction, and preferably consists of only one component, which functions both as a scooper and as a receptacle. The device can be easily operated with one hand, leaving the other hand free to hold a leash. The collector is effective in removing animal waste from any surface, particularly from grass, and the collector holds the waste securely until it can be disposed of.

Generally, the animal waste collector of the present invention comprises an elongate handle having a proximal end for grasping the collector, and a distal end. The distal end is attached to a receptacle, which comprises a holding surface and a collecting surface. The holding surface extends generally transversely from the distal end of the handle, and is preferably oriented at an angle with respect to the handle so that when the handle is held generally vertically, the holding surface slopes toward the handle. The collecting surface extends from the holding surface, opposite from the handle, at an angle with respect to the holding surface so that the collecting surface can be manipulated to a generally horizontal orientation to scoop animal waste from the ground. Moreover, when the handle is held generally vertically, the collecting surface slopes toward the holding surface, so that any animal waste on the collecting surface is transferred to the holding surface.

The collector is very easy to use and lightweight. It can be inexpensively made out of steel rods, and assembled, for example, by spot welding. The collector can be hung for easy storage. Moreover, the collector can be stood upright or on its side for convenient storage and transportation.

These and other features and advantages of the invention will be in part apparent and in part pointed out hereinafter.

BRIEF DESCRIPTION OF THE DRAWINGS

FIG. 1 is a perspective view of an animal waste collector constructed according to the principles of this invention;

FIG. 2 is a bottom plan view of the animal waste collector;

FIG. 3 is a top plan view of the animal waste collector;

FIG. 4 is a front elevation view of the animal waste collector;

FIG. 5 is a rear elevation view of the animal waste collector; and

FIG. 6 is a side elevation view of the animal waste collector.

DETAILED DESCRIPTION OF THE PREFERRED EMBODIMENT

An animal waste collector constructed according to the principles of this invention is indicated generally as 20 in FIGS. 1–6. The apparatus 20 is adapted to be used for collecting animal waste, such as pet waste, and transporting the collected waste for proper disposal. The apparatus 20 comprises an elongate handle 22 having a proximal gripping end 24, and a distal end 26. A holding surface 28 extends generally transversely from the distal end 26 of the handle 22. The holding surface 28 is preferably oriented at an angle of less than ninety (90) degrees with respect to the handle 22 so that when the handle 22 is held generally vertically, the holding surface 28 obliquely faces the handle 22, and thus the holding surface 28 slopes toward the handle 22. In accordance with one embodiment, the holding surface 28 is oriented at an angle of about 85 degrees with respect to handle 22. However, the holding surface 28 could extend perpendicularly to the handle 22, if desired. A collecting surface 30 extends from the holding surface 28, opposite from the handle 22. The collecting surface 30 is oriented at an angle with respect to the holding surface 28 so that when the handle 22 is held generally vertically, the collecting surface 30 slopes toward the holding surface 28, thereby causing animal waste on the collecting surface 30 to slide or roll onto the holding surface 28. In accordance with one embodiment, the collecting surface 30 is oriented at an angle of about 168 degrees with respect to holding surface 28.

In the preferred embodiment of this invention, the handle 22 is of such length that the invention's user may stand upright when grasping the proximal end 24 and placing the collecting surface 30 on the ground. In accordance with one embodiment, handle 22 is of such a length that the animal waste collector 20 may be stood upright on holding surface 28.

As shown in the Figures, the holding surface 28 and the collecting surface 30 can comprise a plurality of generally parallel rods 32. However, the rods 32 in the center of the surfaces 28 and 30 are preferably more closely spaced than the rods 32 at the sides of the surfaces 28 and 30, thus enabling the animal waste collector to collect and hold smaller animal waste.

The animal waste collector 20 preferably further comprises a back surface 36, adjacent to the holding surface 28, and preferably on the same side of the holding surface 28 as the handle 22. The back surface 36 is preferably parallel to the handle 22. The back surface 36 is adjacent the end of the holding surface 28 closest to the handle 22, and thus the holding surface 28 slopes toward the back surface 36 which helps retain any animal waste on the holding surface 28. The back surface 36 may comprise a plurality of rods, which preferably are generally parallel. In the preferred embodiment, the holding surface 28, the collecting surface 30, and the back surface 36 are formed by the same rods 32, which are bent at 34 and 38 to define the three surfaces.

The animal waste collector 20 may further comprise side members 40 to help retain animal waste on the holding surface 28. The side members 40 are positioned adjacent each side of the holding surface 28, and slightly above the plane of the holding surface 28 (when the handle 22 is held vertically) so that the side members 40 help prevent animal waste from falling off the sides of the holding surface 28. The side members 40 may be rods which extend from the handle 22 generally parallel to the holding surface 28. The rods 40 in the preferred embodiment generally extend from the back surface 36 the length of the holding surface 28.

As shown in the Figures, the animal waste collector 20 is preferably fabricated from a wire loop 46 bent in a generally inverted "U" shape, with the bottom of the "U" forming the proximal end 24 of the handle 22. The ends of the "U" form the distal end 26 of the handle 22 and are bent at 48 to form the side members 40. Two rails 42 and 44 extend transversely between the legs of the "U", forming the back surface 36. A plurality of rods 32 are secured to the rails 42 and 44, generally parallel with the handle 22, and bend at 34 to extend generally transversely from the handle 22 to form the holding surface 28. The rods 32 bend again at 38 to form the collecting surface 30.

OPERATION

In operation, the animal waste collector 20 is used by grasping the handle 22 at the gripping end 24 and holding the handle 22 at an angle so that the collecting surface 30 is generally parallel to the ground and is facing the user. The user then pulls the collector toward him/her, drawing the collecting surface 30 under the animal waste. Ideally, the handle 22 is of such length that the user would not need to bend or contort its body while easily pulling the collecting surface under the animal waste. When the waste is on the collecting surface 30, the user manipulates the handle 22 until the holding surface 28 is generally horizontal. At such time, the waste on the collecting surface 30 will slide or roll onto the holding surface 28. The back surface 36 and side members 40, as shown in the Figures, will help keep the animal waste on the holding surface 30, until the waste can be disposed of.

After the waste is on the holding surface 28, the user may hold the handle 22 generally vertically, and the waste will remain on the holding surface 28. To pick up more waste, the collecting surface 30 is again manipulated generally parallel to the ground whereupon waste on the holding surface 28 may transfer to the collecting surface 30. However, because the collecting surface 30 is generally horizontal, the waste remains on the collecting surface 30. The handle is then manipulated generally vertically so that the old and newly collected waste transfer to the holding surface 28. This process may be repeated several times before the waste needs to be disposed of. Thus the invention may be used effectively with one hand, and may easily transport animal waste until it can be disposed of.

As various changes could be made in the above constructions without departing from the scope of the invention, it is intended that all matter contained in the above description shall be interpreted as illustrative and not in a limiting sense.

What is claimed is:

1. An animal waste collector comprising:

an elongate handle having two ends, a gripping end and a distal end; a holding surface extending generally transversely from the distal end of the handle; and a collecting surface extending from the holding surface opposite the handle, at an angle with respect to the holding surface so that the holding surface and collecting surface are in a generally concave relationship and at an angle with respect to the handle so that when the handle is held at an angle with respect to horizontal, the collecting surface is oriented generally horizontally, and when the handle is held generally vertically, the collecting surface slopes toward the handle to cause animal waste on the collecting surface to move to the holding surface; and wherein at least the collecting surface is formed by a plurality of generally parallel rods; and the rods forming the collecting surface being more closely spaced at the center of the surface than at the side edges.

2. An animal waste collector comprising:

an elongate handle having a proximal end for grasping the collector, and a distal end; a head on the distal end of the handle, the head comprising a holding surface having a front, a back, and opposite sides, and extending generally transversely with respect to the distal end of the handle; a back surface at the back of the holding surface for retaining animal waste on the holding surface, oriented at an angle with respect to the holding surface so that the surfaces obliquely face each other; a collecting surface extending from the front of the holding surface, at an angle with respect to the holding surface so that the holding surface and collecting surface are in a generally concave relationship, the collecting surface being oriented at an angle with respect to the handle so that when the handle is held at an angle with respect to horizontal, the collecting surface is oriented generally horizontally, and when the handle is held generally vertically, the collecting surface slopes toward the holding surface to cause animal waste collected on the collecting surface to transfer to the holding surface; and side members at the sides of the holding surface for retaining waste on the holding surface; and wherein at least the collecting surface is formed by a plurality of generally parallel rods and wherein the rods forming the collecting surface are more closely spaced at the center of the surface than at the side edges.

3. A method of collecting animal waste on the ground, the method comprising the steps of:

grasping an animal waste collector having an elongate handle having a proximal end for grasping the collector, and a distal end; a head on the distal end of the handle, the head comprising a holding surface having a front, a back, and opposite sides, and extending generally transversely with respect to the distal end of the handle; a back surface at the back of the holding surface for retaining animal waste on the holding surface, oriented at an angle with respect to the holding surface so that the surfaces obliquely face each other; a collecting surface extending from the front of the holding surface, at an angle with respect to the holding surface so that the holding surface and collecting surface are in a generally concave relationship, the collecting surface being oriented at an angle with respect to the handle so that when the handle is held at an angle with respect to horizontal, the collecting surface is oriented generally horizontally, and when the handle is held generally vertically, the collecting surface slopes toward the holding surface to cause animal waste collected on the collecting surface to transfer to the holding surface; and side members at the sides of the holding surface for retaining waste on the holding surface;

manipulating the handle of the collector to an angle with respect to horizontal so that the collecting surface extends generally horizontally, parallel to the ground behind the animal waste;

pulling the collector, thereby drawing the collecting surface under the animal waste; and manipulating the handle to a generally vertical orientation to cause the animal waste collected on the collecting surface to transfer to the holding surface.

4. A method of collecting animal waste of claim 3 wherein at least the collecting surface of the animal waste collector is formed by a plurality of generally parallel rods.

5. A method of collecting animal waste of claim 4 wherein the rods of the animal waste collector are more closely spaced at the center of the collecting surface than at the side edges of the collecting surface.

\* \* \* \* \*